United States Patent [19]

Kato et al.

[11] Patent Number: 4,977,128
[45] Date of Patent: * Dec. 11, 1990

[54] CATALYST FOR COMBUSTION AND PROCESS FOR PRODUCING SAME

[75] Inventors: Yasuyoshi Kato; Nobue Teshima, both of Kure; Masao Ohta, Hiroshima; Kunihiko Konishi, Kure, all of Japan

[73] Assignee: Babcock-Hitachi Kabushiki Kaisha, Japan

[*] Notice: The portion of the term of this patent subsequent to Dec. 8, 2004 has been disclaimed.

[21] Appl. No.: 138,605

[22] Filed: Dec. 29, 1987

[51] Int. Cl.$^5$ .................................. 502 332; 502 334
[52] U.S. Cl. .................................................. 502/328
[58] Field of Search .................................. B01J/23/58

[56] References Cited

U.S. PATENT DOCUMENTS

| | | | |
|---|---|---|---|
| 4,514,515 | 4/1985 | Travers et al. | 502/332 |
| 4,539,311 | 9/1985 | Harrison et al. | 502/328 |
| 4,585,752 | 4/1986 | Ernest | 502/332 |
| 4,621,071 | 11/1986 | Blanchard et al. | 502/328 |
| 4,711,872 | 12/1987 | Kato et al. | 502/328 |
| 4,788,174 | 11/1988 | Arai | 502/328 |

FOREIGN PATENT DOCUMENTS 60-238146 11/1985 Japan.
61-245844 11/1986 Japan.

Primary Examiner—Patrick P. Garvin
Assistant Examiner—E. D. Irzinski
Attorney, Agent, or Firm—Leydig, Voit & Mayer

[57] ABSTRACT

A high performance catalyst for combustion is provided which includes a heat-resistant carrier capable of retaining a high specific surface area even when it is used at a high temperature of 1,000° C. or higher for a long time, and processes for producing and using the same are provided, which catalyst comprises a compound expressed by a composition formula of $BaAl_{12}O_{19}$, and the process for producing the catalyst comprises kneading $\gamma$-alumina or aluminum hydroxide and a barium compound or impregnating the former compound with the latter so as to give an atomic ratio of Al/Ba in the range of 100/1 to 100/15, followed by calcination. The process of using the catalyst comprises contacting a volatile organic material under combustion conditions with a catalytic amount of $BaAl_{12}O_{19}$ and producing combustion products.

10 Claims, 2 Drawing Sheets ant invention are produced by adding a barium compound such as barium nitrate, barium hydroxide, barium acetate, etc., to, γ-alumina or an aluminum compound which is converted into γ-alumina by calcination, according to an impregnation method or a kneading method, followed by drying and calcining. Typically, the catalyst carrier and catalyst of the pres-

CATALYST FOR COMBUSTION AND PROCESS FOR PRODUCING SAME

BACKGROUND OF THE INVENTION

1. Field of the Invention

This invention relates to a carrier for a combustion catalyst, to a catalyst for combustion, and to processes for producing and using the same. Particularly it relates to a catalyst carrier which maintains a high activity and retains a high specific surface area at elevated temperatures, and to a process for producing the same.

2. Description of the Prior Art

In recent years, research and development on making combustors highly efficient and compact have been actively advanced in various fields by applying the so-called catalytic combustion principle, wherein combustion is promoted using a catalyst, to various combustors such as gas turbines. Usually it is necessary for the catalyst used in such combustors to maintain its activity at high temperatures of 1,000° C. or higher.

Furthermore, in various petrochemistry-related industries, too, there is a tendency to use such catalysts at higher temperatures for yield improvement or for producing new products; hence improvement in heat resistance of such catalysts has been a serious problem for their development.

The factors governing the heat stability or resistance of catalysts varies depending on the catalyst, but in the case of a catalyst having an active ingredient supported on a carrier, the heat stabilities of the carrier and the active ingredient govern the heat resistance. Particularly in the case of a catalyst used at temperatures exceeding 1,000° C., it is indispensable for enhancing the heat resistance that the carrier barely sinter and retain a high specific surface area at high temperatures. Thus, various inventions directed to oxides which are stable at high temperatures, that is, carriers having a high melting point and a specific surface area have been made. For example, stabilized zirconia ($ZrO_2$), composite oxides such as mullite ($2Al_2O_3 \cdot 3SiO_2$), spinel ($MgAl_2O_4$), La-containing $\beta$-$Al_2O_3$, etc., have been studied (Japanese Patent Application No. Sho 59-92866/1984).

However, it is the present state of the art that these carriers are not regarded as having those characteristics necessary to obtain a high performance catalyst. For example, zirconia, mullite, etc., have a tendency that when they are kept at high temperatures of 1,000° C. or higher for a long time, their specific surface areas are gradually reduced. La-containing $\beta$-$Al_2O_3$ has superior properties of retaining a high specific surface area at high temperatures, but lanthanum compounds are expensive as raw materials, and moreover there is a problem that unless it is prepared from an aqueous solution of a lanthanum salt and an aluminum salt, according to a complicated coprecipitation method, its characteristics cannot be fully exhibited.

SUMMARY OF THE INVENTION

The object of the present invention is to provide a high performance catalyst for combustion having overcome the above-mentioned drawbacks of the prior art and having an inexpensive and heat-resistant carrier capable of retaining a high specific surface area even when it is used at high temperatures of 1,000° C. or higher for a long time. Further objects include processes for producing such a catalyst and a carrier and for methods of using the same.

In order to achieve the above objects, the present inventors have conducted extensive research on a heat-resistant catalyst carrier based on aluminum compounds, preferably alumina and substances capable of forming same, and as a result have found that a carrier obtained by converting a portion or the total alumina into a compound expressed by a composition formula of $BaAl_{12}O_{19}$ causes no change in physical properties even at high temperatures such as 1,200° C. or higher and retains a high specific surface area.

In short, the present invention resides in a heat-resistant catalyst comprising a compound expressed by a composition formula of $BaAl_{12}O_{19}$ according to a structural analysis based on X-ray diffraction or the like. The catalyst of the present invention has no particular limitation to the raw materials used in its preparation, and those may be sufficient which are identified to have $BaAl_{12}O_{19}$ formed therein according to a structural analysis such as X-ray diffraction. In other words, those which contain a compound of $BaAl_{12}O_{19}$ under conditions in which the carrier and catalyst are used, such as in combustion reactions, fall within the scope of the present invention. When used as a carrier for a combustion catalyst, $BaAl_{12}O_{19}$ may be used with other substances which themselves are capable of acting as catalysts, particularly Pt and Rh. Furthermore, even when $BaAl_{12}O_{19}$ functions not only as carrier but also as catalyst, this, of course, falls within the scope of the present invention.

The catalysts of the present invention, including those catalysts formed from $BaAl_2O_{19}$ and those formed from $BaAl_2O_{19}$ and Pt or Rh, may be employed in any combustion reaction in which a volatile combustible organic compound, typically present as a gas or in the vapor state, is subjected to a combustion reaction. Typically, the material undergoing the combustion reaction is a hydrocarbon, mixture of hydrocarbons, or a petroleum-based fraction, as for example, gasoline, kerosene, or aviation fuel or mixtures of one of the foregoing and the products of combustion thereof. The $BaAl_{12}O_{19}$ catalysts of the present invention are expected to have most widespread application in treating gaseous exhaust emanating from internal combustion engines, such as in the exhaust systems of automobiles.

DETAILED DESCRIPTION OF PREFERRED EMBODIMENTS

Figure 1:
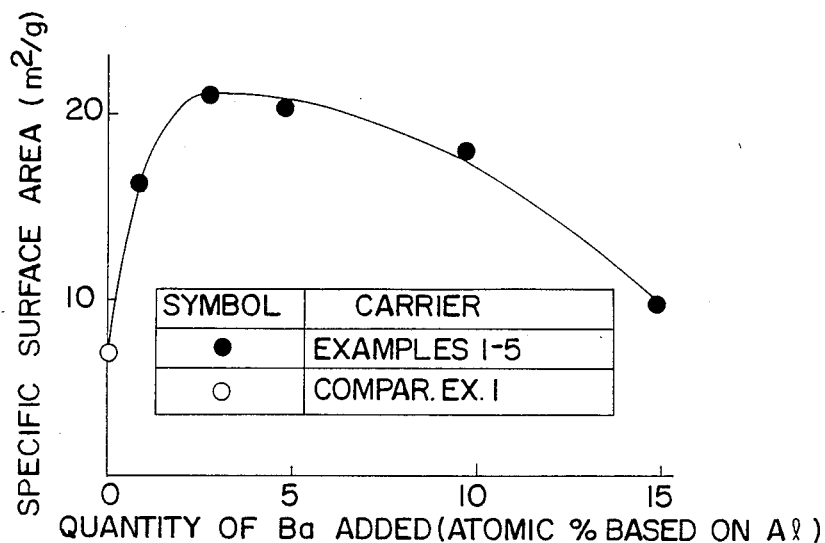
FIG. 1 shows a graph illustrating the specific surface area relative to the quantity of Ba added, of the catalyst carrier used in Examples of the present invention.

The heat-resistant catalyst and carrier for a catalyst of the present invention are produced by adding a barium compound such as barium nitrate, barium hydroxide, barium acetate, etc., to, γ-alumina or an aluminum compound which is converted into γ-alumina by calcination, according to an impregnation method or a kneading method, followed by drying and calcining. Typically, the catalyst carrier and catalyst of the present invention formed from $BaAl_2O_{19}$ are produced by adding a water-soluble barium salt and water to γ-alumina or aluminum hydroxide, followed by kneading the mixture, or by impregnating a molded product of γ-alumina with a solution of a water-soluble barium salt dissolved in water, followed by drying and calcining. As the barium salt, barium nitrate ($Ba(NO_3)_2$), barium acetate ($Ba(CH_3COO)_2$), barium hydroxide ($Ba(OH)_2 \cdot 8H_2O$), etc., may be used. Further, the quantity of the barium compound added is preferred to be chosen so that the atomic ratio of Al/Ba may be in the range of about 100/1 to about 100/15. As to the calcination, by carrying out calcination at 1,000° C. or higher, preferably at 1,200° C. or higher, it is possible to reduce change in physical properties at high temperatures.

When $BaAl_{12}O_{19}$ is used in conjunction with a metal component as a catalyst according to the present invention, samples of $BaAl_2O_{19}$ are contacted, such as by immersion in or impregnation with a solution of a Pt or Rh metal compound. The catalysts are then optionally rinsed (such as when the solution used to deposit platinum on the $BaAl_{12}O_{19}$ contains chlorine, as for example, $H_2PtCl_6$), dried, and calcined The $BaAl_{12}O_{19}$ catalysts of the present invention, both those containing an additional metal and those without such metal, may be used to catalyze combustion of volatile materials, such as those present in the gaseous or vapor state under combustion conditions. Preferably, these materials are volatile organic compounds which are also in the gaseous state under ambient conditions. Combustion is often effected under elevated temperature conditions and the catalysts and carrier of the present invention are capable of sustaining such elevated temperature conditions for long periods of time. The volatile organic materials which are to undergo combustion are brought into contact with the catalysts of the present invention generally in a reaction zone under which combustion conditions are maintained. The volatile organic materials, which may contain amounts of noncombusted material in the presence of combustion products, such as in an exhaust system of an internal combustion engine, undergo efficient conversion to combustion products.

The present invention will be described in more detail by way of Examples.

Examples 1-5

Barium acetate ($Ba(CH_3COO)_2$) was mixed with γ-$Al_2O_3$ powder having an average diameter of 3μ so as to give a ratio of Al/Ba of 100/1, 100/3, 100/5, 100/10, or 100/15, for each of Examples 1-5, respectively, followed by adding water (30 ml), kneading the mixture with a mortar, and drying the resulting paste at 180° C. Thereafter, the dried material was ground to a size of 60 mesh or less, molded into a cylindrical product of 5 mm ×5 mmL by means of a press, placed in a platinum crucible, and calcined at 1,200° C. for 2 hours.

Comparative Example 1

Without adding barium acetate, γ-$Al_2O_3$ powder, alone was molded and calcined in the same manner as in Examples 1-5.

Comparative Example 2

Using lanthanum nitrate ($La(NO_3)_3 \cdot 6H_2O$) in place of barium acetate, a carrier was prepared in the same manner as in Example 3.

Results obtained by examining the respective specific surface areas of the carriers prepared in Examples 1-5 and Comparative Example 1 are shown in FIG. 1. It is seen from this figure that by adding Ba, it is possible to retain a high specific surface area even after calcination at 1,200° C, and as to the quantity of Ba added, its effectiveness is notable in the range of an atomic ratio of Al/Ba of 100/3 to 100/10.

Figure 2:
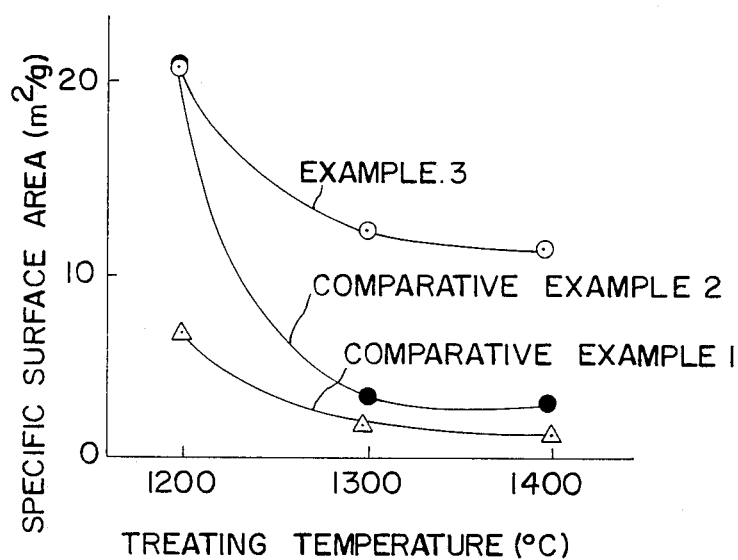
FIG. 2 shows graphs illustrating a comparison of the specific surface area of the catalyst carrier after high temperature treatment of Example 3 with those of Comparative examples.
Figure 3:
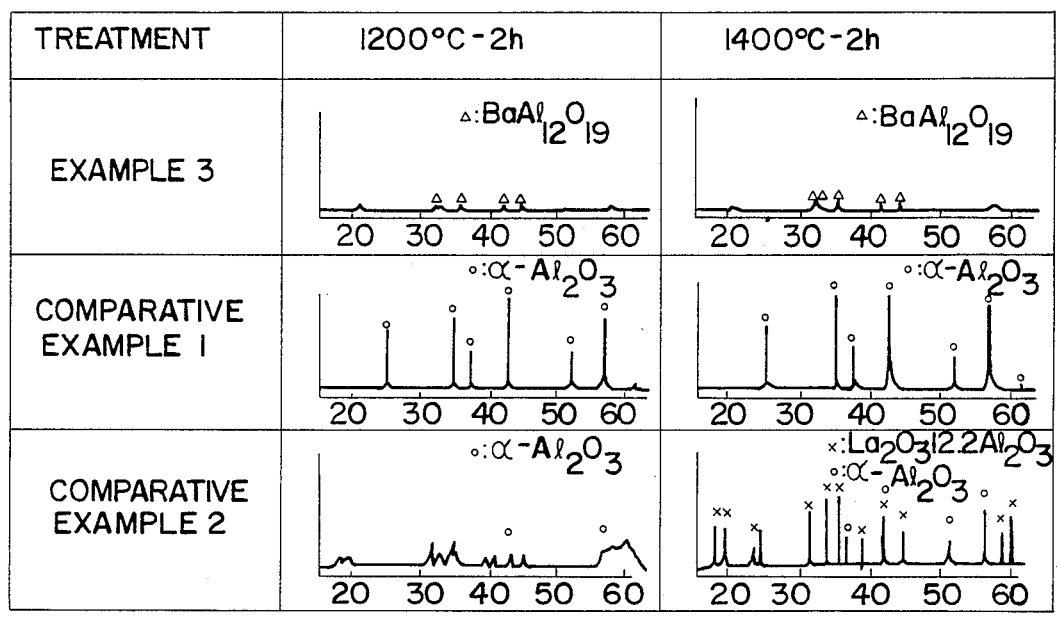
FIG. 3 shows X-ray diffraction patterns of the catalyst carriers of Example 3 and Comparative examples.

Further, FIG. 2 shows changes in the respective specific surface area of the carriers of Example 3 and Comparative Examples 1 and 2, further subjected to heat treatment at 1,200° C., 1,300° C., or 1,400° C. for 2 hours. As shown in this figure, the carrier of the present invention is a superior one which can retain 5 the specific surface area of $10m^2/g$ or more up to 1,400° C., as compared with the carriers of Comparative Examples 1 and 2. FIG. 3 shows X-ray diffraction patterns of these carriers, and in the case of the Ba-added carrier of the present invention, only a broad peak of $BaAl_{12}O_{19}$ is observed; thus it was found that the main component of the carrier was of fine $BaAl_{12}O_{19}$ compound. Further, in the case of the carrier of the present invention, even after it is heat-treated at 1,400° C., the peaks of $BaAl_{12}O_{19}$ do not become sharp and hence the carrier is judged to have a fine particle diameter, whereas in the case of Comparative Example 1, when heat treatment is carried out at a temperature of 1,200° C. or higher, and in the case of Comparative Example 2, when heat treatment is carried out at 1,400° C., sharp peaks of γ-$Al_2O_3$ or $La_2O_3 \cdot 11Al_2O_3$ are observed; thus it is seen that in both cases sintering occurs and particles grow at high temperatures. From the above results, it is certain that the reason that the carrier of the present invention is stable at high temperatures is due to the presence of a compound of $BaAl_{12}O_{19}$ having a superior heat stability; this evidences the validity of the present invention.

Example 6 and Comparative Examples 3 and 4

The substances prepared in Example 3 and Comparative Examples 1 and 2 (each 30g) were used as carriers and were immersed in an aqueous solution (100 ml) of platinic acid, $H_2(PtCl_6) \cdot 6H_2O$, having a Pt concentration of 3 mg/ml. The carriers were left to stand for 12 hours to deposit platinum on the carrier by ion exchange. The resulting materials were washed with purified water (250ml) three times to eliminate excess chlorine ion, followed by drying at 180° C. and calcining at 1,100° C. for 2 hours to obtain the catalysts of Example 6 and Comparative Examples 3 and 4, respectively. Further, in order to evaluate the heat resistance of the catalysts, they were subjected to heat treatment in air at 1,200° C. for 200 hours or at 1,400° C. for 2 hours.

EXAMPLE 7 AND COMPARATIVE EXAMPLES 5 AND 6

The substances prepared in Example 3 and Comparative Examples 1 and 2 (each 30g) were employed as carriers for catalysts and were impregnated with an aqueous solution (12ml) of rhodium nitrate, $Rh(No_3)_3$, having a Rh concentration of 6 mg/ml. Impregnation was followed by drying at 180° C. and calcining at 1,200° C. to obtain the catalysts of Example 7 and Comparative Examples 5 and 6, respectively.

Using the catalysts of Examples 6 and 7 and Comparative Examples 3-6 (each 20ml), the combustion tests with propane were carried out.

These catalysts (each 10ml) were respectively placed in a quartz reaction tube (20ml) and subjected to measurement of the combustion activity of propane under the following conditions:

Test Conditions
(1) SV: 30,000 h$^{-1}$
(2) Gas Composition: $O_2$, 8%; $C_3H_8$, 1.2%; and $N_2$, the balance
(3) Preheated temperature of gas: 450° C.

Further, in order to evaluate the heat resistance of the thus obtained catalysts, they were subjected to heat treatment in air at 1,200° C. for 200 hours or at 1,400° C. for 2 hours.

The results are shown in Table 1.

TABLE 1

| Example | Percentage combustion of LPG (%) | | |
|---|---|---|---|
| | Initial period | After heat-treatment of 1,200° C.-200 hr | After heat-treatment of 1,400° C.-2 hr |
| 6 | 70 | 64 | 20 |
| 7 | 99 or more | 99 or more | 55 |
| Comparative 3 | 5 | 5 | 2 |
| Comparative 4 | 5 | 5 | 2 |
| Comparative 5 | 7 | 6 | 2 |
| Comparative 6 | 65 | 45 | 5 |

From Table 1, it is seen that the catalyst having Pt or Rh as an active component supported on the carrier of the present invention shows superior combustion activity which hardly diminishes. A rather high activity is maintained after the heat treatment test at 1,200° C. × 200 hr, and even after the severe test at 1,400° C. × 2 hr a rather high activity is maintained.

In contrast, the catalysts of Comparative Examples 3 and 5, where $\gamma$-$Al_2O_3$ is used as a carrier, shows a low activity from the initial stage. Further, the catalysts of Comparative Examples where La-$\gamma$-$Al_2O_3$ is used as a carrier shows a relatively high activity in the heat resistance test at 1,200° C. x 200 hr, but the activity diminishes remarkably at the test at 1,400° C. x 2 hr.

As described above, the carrier of the present invention shows a superior property in the case where Pt or Rh is supported thereon.

EXAMPLE 8

A 2.5 kg sample of barium acetate, $Ba(CH_3COO)_2$, was dissolved in water (4 liters), followed by adding 10 kg of $\gamma$-$Al_2O_3$ powder having an average diameter of 3$\mu$ and kneaded with heating by means of a kneader to obtain a mass of paste. The resulting paste was molded into a rod having a diameter of 1 $\mu$ by using an extruder. The rod was dried for 2 hours in air and for 3 hours at 180° C., and calcined for 2 hours at 800° C. The calcined product was hammer milled, and subjected to classification to obtain a powder having a diameter of 100 mesh or less. To the resulting powder (3 kg), carboxymethylcellulose (CMC) (90 g) and water (1.6 kg) were added, followed by kneading and molding by means of an extruder to obtain an extruded form of honeycomb (outer size: 35 mm × 35 mm) having each cell size of 1.4 mm and cell thickness of 0.4 mm. This was followed by standing for a day and night to mature in a saturated steam of 80° C., drying for 2 hours at 180° C. and calcining for 2 hours at 1,200° C. to obtain a honeycomb body of $BaAl_{12}O_{19}$.

Combustion Tests

The following combustion tests were carried out to evidence the catalytic effect of the $BaAl_{12}O_{19}$ composition under high temperature combustion conditions.

A honeycomb catalyst of Pd/$Al_2O_3$ (Pd 0.5% by weight, honeycomb cell size: 1.4 mm, cell thickness: 0.4 mm) was cut off in the flow direction to form catalysts each having a size of 20 mm × 5 mm length.

On the other hand, a honeycomb catalyst of $BaAl_{12}O_{19}$ obtained in Example 8 was cut off in the flow direction to form catalysts each having a size of 20 mm × 45 mm length. The Pd/$Al_2O_3$ catalysts and $BaAl_{12}O_{19}$ catalysts were packed in a reaction tube such that the former catalysts were positioned in the inlet side and the latter catalysts about 5 mm downstream and apart from the former catalysts. The catalysts were subjected to combustion tests under the following conditions.

Gas flow rate: 7.8 liters/min.

Gas composition: $O_2$ 8%, $C_3H_8$ 2%, $N_2$ residue (by volume)

Preheated temperature of gas: 400° C.

The Pd/$Al_2O_3$ catalyst was utilized for preheating the gas through a partial combustion thereof. This simulates, to some extent, the situation which may occur in the exhaust system of an internal combustion engine. The temperature of the gas flowing into the $BaAl_{12}O_{19}$ catalyst layer was about 650° C.

A comparative combustion test was carried on under the same condition as above with the exception that only Pd/$Al_2O_3$ catalysts each having a size of 20 mm × 5 mm length were packed in the reaction tube.

The results are shown in Table 2.

TABLE 2

| Catalyst for preheating | Catalyst of $BaAl_{12}O_{19}$ | Percentage combustion | Gas temp. in the center of catalysts layer (°C.) |
|---|---|---|---|
| Pd/$Al_2O_3$ | Present | 100 | 1,400 |
| Pd/$Al_2O_3$ | Absent | 48 | 860 |

From the above results, it is noted that a high temperature combustion can be achieved by using a composition of $BaAl_{12}O_{19}$ having no active metal component deposited on it.

We claim:

1. A catalyst for combustion comprising a compound expressed by a composition formula of $BaAl_{12}O_{19}$ having Pt or Rh supported thereon.

2. A catalyst carrier useful for combustion reactions consisting essentially of a compound expressed by a composition formula of $BaAl_{12}O_{19}$.

3. A process for producing a catalyst carrier useful for combustion reactions which consists essentially of kneading (a) at least one of $\gamma$-alumina and aluminum hydroxide and (b) an aqueous solution of a barium compound, or impregnating (a) with (b), so as to give an atomic ratio of Al/Ba in the range of 100/1 to 100/15, followed by drying and calcining the resulting mixture to produce $BaAl_{12}O_{19}$.

4. A process for producing a catalyst carrier useful for combustion reactions according to claim 3 wherein said barium compound is at least one compound selected from the group consisting of barium nitrate, barium acetate, and barium hydroxide.

5. A process for producing a catalyst carrier useful for combustion reactions according to claim 3 wherein said atomic ratio of Al/Ba is in the range of 100/3 to 100/10.

6. A process for producing a catalyst carrier useful for combustion reactions according to claim 3 wherein said calcination is carried out at 1,000° C. or higher.

7. A process for producing a catalyst for combustion which comprises kneading (a) at least one of γ-alumina and aluminum hydroxide and (b) an aqueous solution of a barium compound or impregnating (a) with (b) so as to give an atomic ratio of Al/Ba in the range of 100/1 to 100/15, followed by drying, calcining, and treating the resulting mixture substance having formula $BaAl_{12}O_{19}$ with an element or compound of platinum or rhodium.

8. A process for producing a catalyst carrier useful for combustion reactions according to claim 3 wherein said calcination temperature is 1200° C. or higher.

9. A catalyst for combustion according to claim 1 wherein said catalyst is capable of retaining a high specific surface area at temperatures in excess of 1000°.

10. A catalyst carrier useful for combustion reactions according to claim 2 wherein said catalyst carrier is capable of retaining a high specific surface area at temperatures in excess of 1000°.

* * * * *